(12) United States Patent
Loyd et al.

(10) Patent No.: US 6,651,646 B1
(45) Date of Patent: Nov. 25, 2003

(54) BARBECUE GRILL WITH RECIRCULATION FAN

(75) Inventors: Casey Loyd, Pomona, CA (US); Pedro Vargas, Pomona, CA (US)

(73) Assignee: California Acrylic Industries, Pomona, CA (US)

(*) Notice: Subject to any disclaimer, the term of this patent is extended or adjusted under 35 U.S.C. 154(b) by 0 days.

(21) Appl. No.: 10/190,071

(22) Filed: Jul. 3, 2002

(51) Int. Cl.[7] ................................................. F24C 3/00
(52) U.S. Cl. .................. 126/25 R; 126/41 R; 126/15 A
(58) Field of Search ..................... 126/25 R, 41 R, 126/15 A

(56) References Cited

U.S. PATENT DOCUMENTS

| | | |
|---|---|---|
| 3,159,119 A | 12/1964 | Hottenroth et al. |
| 3,326,201 A | 6/1967 | Murray |
| 3,327,697 A | 6/1967 | Berlant |
| 3,529,556 A | 9/1970 | Barnes |
| 3,868,943 A | 3/1975 | Hottenroth et al. |
| 3,982,522 A | 9/1976 | Hottenroth et al. |
| 4,044,750 A | 8/1977 | Zeigler |
| 4,209,006 A | 6/1980 | Marsalko |
| 4,287,870 A | 9/1981 | Johnson |
| 4,418,615 A * | 12/1983 | Higgins ........................ 99/331 |
| 4,616,627 A | 10/1986 | Haygood |
| 4,823,684 A | 4/1989 | Traeger et al. |
| 4,850,333 A | 7/1989 | Dellrud et al. |
| 4,867,050 A | 9/1989 | Patenaude et al. |
| 5,154,159 A | 10/1992 | Knafelc et al. |
| 5,168,860 A | 12/1992 | Kibourian |
| D357,383 S | 4/1995 | Dornbush et al. |
| 5,429,110 A | 7/1995 | Burke et al. |
| 5,466,912 A | 11/1995 | Dornbush et al. |
| 5,996,572 A * | 12/1999 | Ilagan ..................... 126/25 AA |

* cited by examiner

*Primary Examiner*—Alfred Basichas
(74) *Attorney, Agent, or Firm*—Denton L. Anderson; Sheldon & Mak

(57) ABSTRACT

A barbecue grill has a heating compartment and a plenum chamber disposed proximate to the heating compartment. The plenum chamber has a central vent for providing access to the central portion of the heating compartment and a pair of opposed side vents to provide access to the two opposed side portions of the heating compartment. A recirculation fan is disposed proximate to the central vent. The recirculation fan is adapted to draw hot gases from the central portion of the heating compartment into the plenum and drive those gases via the plenum into the side portions of the heating compartment via the pair of opposed side vents.

3 Claims, 1 Drawing Sheet

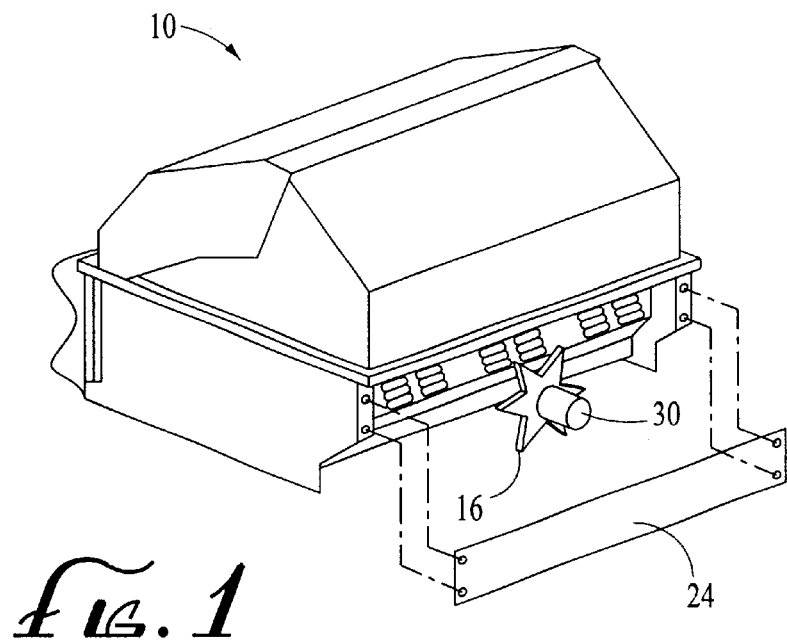
*fig.1*
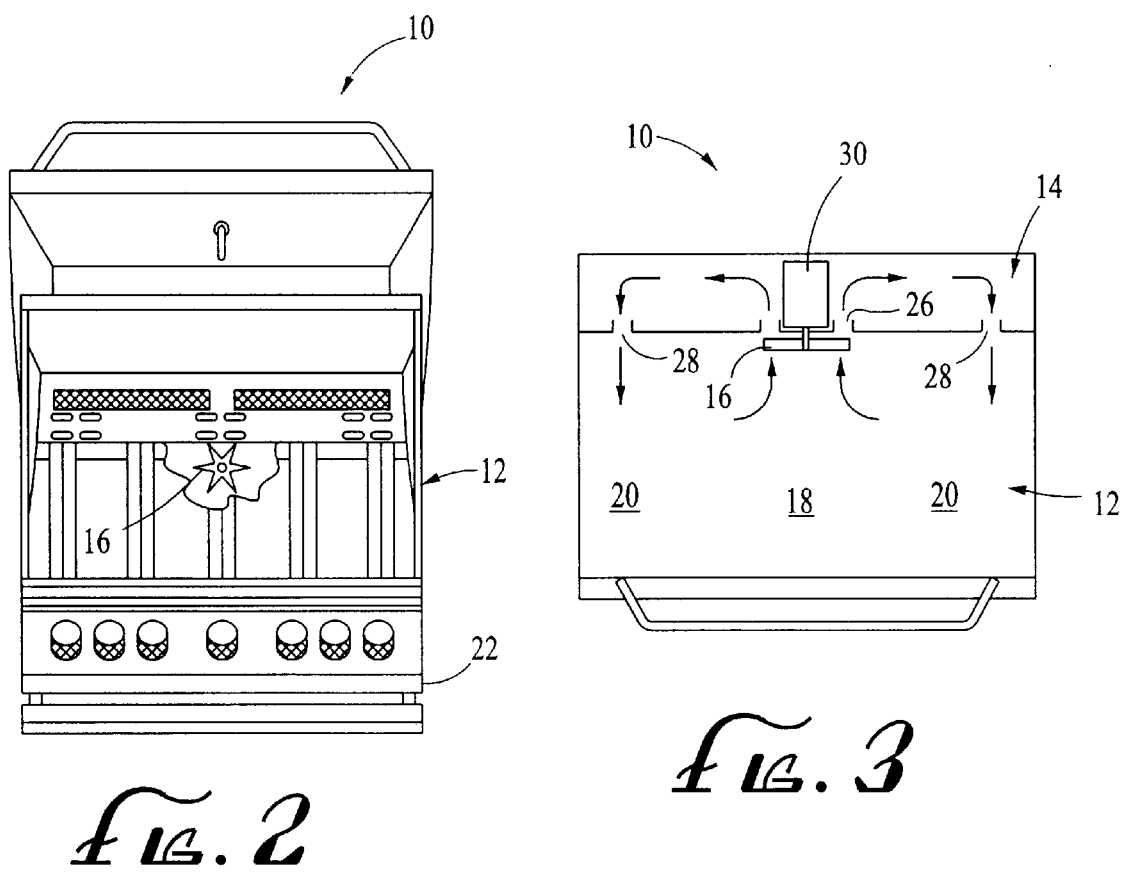
*fig.2*  *fig.3*

BARBECUE GRILL WITH RECIRCULATION FAN

BACKGROUND OF THE INVENTION

Outdoor barbecue grills have become increasingly popular for the summer time cooking of meats and vegetables. Traditionally, barbecue grills have been heated by charcoal briquettes, but a new generation of barbecue grills are heated by gas fired burners.

Many modern barbecue grills have a closeable hood or other structure which can be used to provide an enclosed heating compartment. Such heating compartment can be used like the oven on a stove to slow roast various items of food, such as large pieces of meat.

A problem with present day barbecue grills is that the heat within the cooking compartment is non-uniform. The heat in the central portion of the cooking department tends to be much more intense than the heat in the side portions of the cooking compartment. This leads to uneven cooking within the cooking compartment and makes the use of the outdoor grill somewhat haphazard.

Accordingly, there is a need for a barbecue grill which overcomes this problem in the prior art.

SUMMARY OF THE INVENTION

The invention satisfies this need. The invention is a barbecue grill comprising (a) a cooking compartment having a central portion and a pair of opposed side portions, (b) a plenum disposed proximate to the cooking compartment, the plenum comprising a central vent for providing access between the plenum and the central portion of the cooking compartment and a pair of opposed side vents for providing access between the plenum and each of the two opposed side portions of the cooking compartment, and (c) a fan for drawing hot gases from the central portion of the cooking compartment into the plenum via the central vent and for redistributing those gases via the plenum and the pair of opposed side vents to the pair of opposed side portions of the cooking compartment, so that hot gases in the central portion of the cooking compartment can be continuously recirculated to the side portions of the cooking compartment.

DESCRIPTION OF THE DRAWINGS

These and other features, aspects and advantages of the present invention will become better understood with reference to the following description, appended claims and accompanying drawings where:

FIG. 1 is an isometric view of a barbecue grill having features of the invention;

FIG. 2 is the front view of the barbecue grill illustrated in FIG. 1; and

FIG. 3 is a cross-sectional plan view in diagrammatic form of the barbecue grill illustrated in FIG. 1.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a barbecue grill 10 comprising a cooking compartment 12, a plenum 14 disposed proximate to the cooking compartment 12 and a recirculation fan 16.

The cooking compartment 12 can have any particular shape. Commonly, the cooking compartment 12 is roughly rectangular and comprises horizontal grill members (not shown) to support food during the cooking process and to allow the downward runoff of greases and other cooking juices. In one typical embodiment, the cooking compartment 12 is roughly 30 inches long, 18 inches wide and 15 inches high above the grill members. The cooking compartment 12 comprises a central portion 18 and a pair of opposed side portions 20.

A heating compartment 22 is disposed below the cooking compartment 12. The heating compartment 22 can comprise a gas fired burner for heating the cooking compartment 12. In an alternative embodiment, the heating compartment 22 can comprise a charcoal bed for retaining a quantity of burning charcoal to heat the cooking compartment 12.

The plenum 14 is typically disposed along the rear side of the cooking compartment 12. The plenum 14 comprises a cover plate 24 for easy access to the plenum 12, such as for cleaning and maintenance. The plenum 14 further comprises a central vent 26 for providing access between the plenum 14 and the central portion 18 of the cooking compartment 12. The plenum 14 further comprises a pair of opposed side vents 28 for providing access between the plenum 14 and each of the two opposed side portions 20 of the cooking compartment 12. Both the central vent 26 and the pair of opposed side vents 28 can comprise a plurality of individual openings, such as illustrated in the drawings.

In a typical embodiment, the plenum 14 is approximately 30 inches long, 2 inches wide and 5 inches high. In such a typical embodiment, the central vent 26 has an open area of approximately 13 square inches and each of the pair of opposed side vents 28 has an open area of approximately 4 square inches.

The recirculation fan 16 is driven by an electric motor 30. The fan 16 is typically disposed proximate to the central vent 26 and is adapted to draw hot gases from the central portion 18 of the cooking compartment 12 into the plenum 14 via the central vent 18. The fan 16 is further adapted to drive those gases within the plenum 14 to the opposed side vents 28 and then into the pair of opposed side portions 20 of the cooking compartment 12.

In a typical embodiment, the fan 16 is a 6 to 11 blade fan driven by a 41 watt electric motor. Such typical fan 16 is capable of moving approximately 110 cubic feet per minute of air. Such a fan 16 can be purchased from ebm Company of Mulfingen, Germany, as Model No. Ref #55462-19480.

The invention provides a barbecue grill which can continuously recirculate hot gases from the central portion of the cooking compartment to the side portions of the cooking compartment, so as to evenly distribute heat within the cooking compartment.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A barbecue grill comprising:
   (a) a cooking compartment having a central portion and a pair of opposed side portions;
   (b) a plenum disposed proximate to the cooking compartment, the plenum comprising a central vent for providing access between the plenum and the central portion of the cooking compartment and a pair of opposed side vents for providing access between the plenum and each of the two opposed side portions of the cooking compartment; and (c) a fan for drawing hot gases from the central portion of the cooking compartment into the plenum via the central vent and for redistributing those gases via the plenum and the pair of opposed side vents to the pair of opposed side portions of the cooking compartment;

so that hot gases in the central portion of the cooking compartment can be continuously recirculated to the side portions of the cooking compartment.

2. The barbecue grill of claim 1 further comprising a gas fired burner for heating the cooking compartment.

3. The barbecue grill of claim 1 further comprising a charcoal bed for retaining a quantity of burning charcoal to heat the cooking compartment.

* * * * *